United States Patent [19]

Chen et al.

[11] Patent Number: 5,282,308
[45] Date of Patent: Feb. 1, 1994

[54] THIN FILM PLANARIZATION PROCESS FOR FABRICATING MAGNETIC HEADS EMPLOYING A STITCHED POLE STRUCTURE

[75] Inventors: Mao-Min Chen; Kochan Ju, both of San Jose; Rodney E. Lee, Prunedale; Ching Tsang, Sunnyvale, all of Calif.

[73] Assignee: International Business Machines Corporation, Armonk, N.Y.

[21] Appl. No.: 998,173

[22] Filed: Dec. 29, 1992

[51] Int. Cl.$^5$ .................................... G11B 5/42
[52] U.S. Cl. ........................ 29/603; 360/125; 427/131
[58] Field of Search ............. 29/603; 427/130–132; 360/119–121, 125–127

[56] References Cited

U.S. PATENT DOCUMENTS

| 4,652,954 | 2/1987 | Church | 360/120 |
| 4,839,197 | 6/1989 | Henderson | 427/116 |
| 4,841,624 | 6/1989 | Togawa et al. | 29/603 |

OTHER PUBLICATIONS

"Electromagnetic Transducer With Thin-Film Pole Pieces" by A. Paton, IBM Tech Discl Bltn, vol. 15, No. 7, Dec. 1972, p. 2182.

"Fabrication Of Thin Film Inductive Heads With Top Core Separated Structure", Kawabe et al, IEEE Trans. Mag., vol. 27, No. 6, Nov. 1991, pp. 4936–4938.

*Primary Examiner*—Carl E. Hall
*Attorney, Agent, or Firm*—Baker, Maxham, Jester & Meador

[57] ABSTRACT

A method for fabricating a thin film magnetic head assembly including the procedure of hardening a portion of the upper pole-tip photoresist mask to create a planarizing stitching pedestal in the region where the upper pole-tip overlaps with the upper pole-yoke. The upper pole assembly is deposited in two steps to create a stitched pole consisting of an upper pole-tip joined to an upper pole-yoke element at the stitching pedestal. The method reduces process complexity by eliminating masking steps and also eliminates the usual close alignment requirements for upper insulation and pole-yoke deposition procedures, thereby improving process yield.

8 Claims, 6 Drawing Sheets

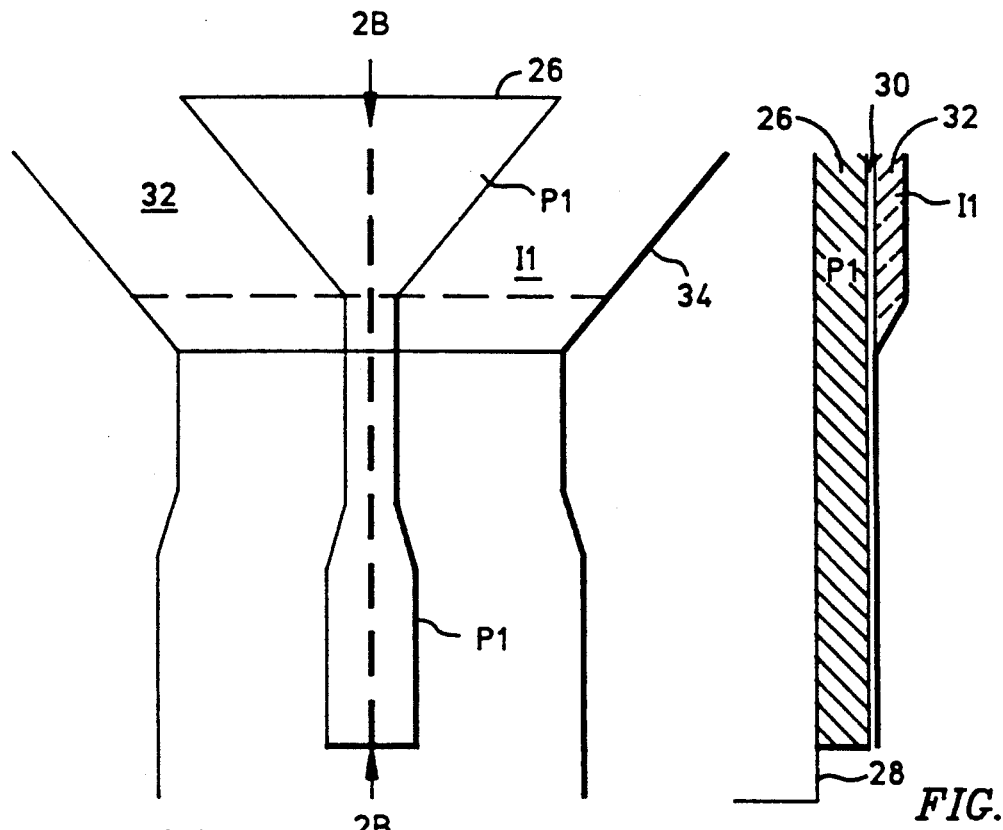
FIG. 2A
FIG. 2B
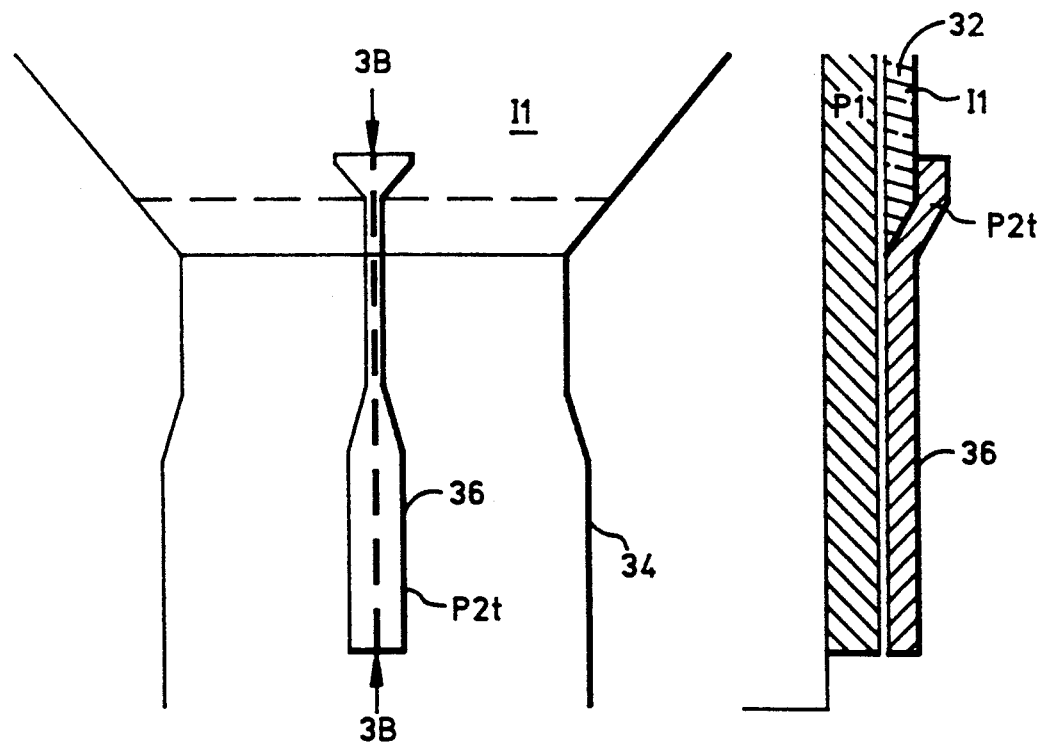
FIG. 3A
FIG. 3B

THIN FILM PLANARIZATION PROCESS FOR FABRICATING MAGNETIC HEADS EMPLOYING A STITCHED POLE STRUCTURE

CROSS-REFERENCES TO RELATED APPLICATIONS

Copending application entitled "Sacrificial Layer Planarization Process For Fabricating A Narrow Thin Film Inductive Head" filed on even date herewith as application Ser. No. 998,085 is incorporated herein in its entirety by this reference. Copending application entitled "Submicron Thin Film Inductive Head With Self-Aligned Staggered Pole-Tips" filed on even date herewith as application Ser. No. 998,171 is incorporated herein in its entirety by this reference. These copending applications are related to this application through common inventorship.

BACKGROUND OF THE INVENTION

1. Field of the Invention

This invention relates to thin film magnetic head fabrication procedures in general and, more specifically, to a planarization procedure for controlling registration in the stitching junction of the upper pole of a magnetic head having a very narrow pole-tip configuration.

2. Discussion of the Related Art

Thin film magnetic read/write heads are used for reading and writing magnetically coded data stored on a magnetic storage medium such as a magnetic disk or magnetic tape. There is a continuing strongly-felt need for increasing the data storage density in such media. Most efforts to increase magnetic data storage density involve techniques for increasing the areal bit density in the magnetic medium.

In rotating magnetic disk drives, the areal density is equivalent to the product of the number of flux reversals per millimeter and the number of tracks available per millimeter of disk radius. Thus, high areal data storage density requires recording heads with high linear resolution and narrow track-width. The linear resolution of a two-pole inductive head is related to the gap between the pole-tips at the air bearing surface (ABS). In the present art, submicron gaps are commonly available. Recent improvements in magnetoresistive (MR) sensor fabrication have led to development of the dual element head, which combines the MR read and inductive write elements. This dual element approach solves the low read-back signal sensitivity problem associated with narrow inductive heads. Thus, further substantial increases in areal recording density can be obtained by emphasizing the narrow gap characteristics of the inductive write head without incurring unnecessary penalties associated with design tradeoffs for improved read signal sensitivity.

In pushing the areal density limit in magnetic recording using the dual MR-inductive element approach, the problems associated with fabricating narrow-track inductive write heads are now more limiting than the problems associated with fabricating narrow-track MR read heads. Experimental and modeling results indicate that further substantial increases in areal recording density must come from reductions in track width rather than from increases in linear flux transition densities in the recording media.

The major barrier to narrower track widths imposed by conventional thin film inductive head fabrication techniques is the extreme topographical variation confronted when defining the upper pole-tip. For instance, FIG. 1 shows the typical topological differences between the pole-yoke area ($t_1$) and the pole-tip area ($t_2$) of a conventional thin film head. Because of the topography shown in FIG. 1, conventional thin film techniques require the upper pole-tip to be deposited through a 15–18 micron layer of photoresist material. Unreliable results are well-known for attempted deposition of a layer width of one to three microns at the bottom of a 15–20 micron groove depth. Several new pole-tip fabrication approaches have been proposed to address this problem.

For instance, in U.S. Pat. No. 4,652,954, Mark A. Church discloses a fabrication technique where a protective chromium layer is deposited over the gap wedge region 10 (FIG. 1) to protect the gap-forming layer 12 from erosion during subsequent processing steps to ensure the desired gap thickness. However, Church does not suggest a solution to the problem presented by a very narrow deposition at the bottom of a deep groove.

This problem is more directly addressed by Eisei Togawa, et al in U.S. Pat. No. 4,841,624. Togawa et al teach the need for a special tapered trench placed laterally across gap wedge 10 to avoid the use of a thick photoresist film during deposition of the upper pole layer. This procedure involves removing the gap-forming layer at the bottom of a recessed insulating film window and then redepositing gap-forming layer material to a thickness equal to the desired gap thickness. Because this new procedure is performed before depositing the upper pole material, the rectangular bottom formed on the gap-forming layer is free of the negative effects of a thick photoresist layer. However, Togawa, et al teach a method requiring many new and exacting masking and etching procedures, which increase the cost of forming precise narrow track heads.

Other practitioners avoid the problems of varying topography by defining the upper pole-tip immediately following the deposition of the gap-forming insulating material layer. A. Paton ("Electromagnetic Transducer With Thin-Film Pole Pieces", IBM Technical Disclosure Bulletin, Vol. 15, No. 7, December, 1972, page 2182) long ago suggested a two-piece pole configuration having a pole-tip element joined to a larger pole-yoke element. More recently, in U.S. Pat. No. 4,839,197, Watson R. Henderson disclosed a process for fabricating a thin film magnetic head where the upper pole-tip is formed immediately following deposition of the gap-forming layer. Because the subsequent insulation layers 14 and 16 and the coil layer 18 (FIG. 1) are not yet in place, the photoresist thickness ($t_2$) in gap wedge region 10 is still relatively small, thereby avoiding the difficulties associated with deeply grooved masks. Unfortunately, Henderson neither teaches nor suggests how to solve process-related problems such as joining or "stitching" the upper pole-yoke layer to the upper pole-tip layer, controlling intermediate erosion of the upper pole-tip or planarizing the surface upon which the upper pole-yoke layer is deposited. Misregistration of insulation layers 14 and 16 at the junction of the lower pole tip (not shown) may provide an extremely uneven surface for the upper pole-yoke layer deposition.

Because the upper pole-tip is exposed during the subsequent insulation and coil deposition steps, the pole-tip surface may be undesireably changed or damaged before completion of the head fabrication. It is well-known that such exposure causes undesirable variations in pole-tip thickness and tracking width.

T. Kawabe, et al ("Fabrication Of Thin Film Inductive Heads With Top Core Separated Structure", *IEEE Transactions on Magnetics*, Vol. 26, No. 6, November, 1991, pp. 4936–4938) discusses an improvement to the Henderson pole-stitching method where a protective film is deposited over the upper pole-tip in the gap wedge region 10 (FIG. 1) to protect it during subsequent processing. This protective or "sacrificial" film is later easily removed with a selective solvent. However, Kawabi, et al neither teach nor suggest a method for planarizing the underlying layers to ensure proper formation of the stitching junction between the upper pole-tip and upper pole-yoke portions of the head.

As used herein, a "stitched" pole is a pole formed in two or more separate steps, such as where a pole-tip is first deposited and a pole-yoke later deposited and joined ("stitched") to the existing pole-tip. Tip-yoke junction formation is not a problem in the earlier single-step upper pole fabrication procedure known in the art because the upper pole is deposited in a single layer. Introduction of the stitched-pole technique adds several new processing problems, including the uneven pole-yoke deposition surface resulting from imprecise registration between the first upper pole-tip deposition and the subsequent insulating layer deposition steps. Misregistration problems cause yield reductions, which increases to the fabrication cost of such heads. Until now, a simple and satisfactory method for eliminating surface planarization problems related to formation of upper pole stitching junctions was unknown in the art. These unresolved problems and deficiencies are clearly felt in the art and are solved by this invention in the manner described below.

SUMMARY OF THE INVENTION

The method of this invention introduces a hardened photoresist stitching pedestal following deposition of the upper pole-tip to ensure junction registration and to eliminate the critical alignment required for subsequent insulation depositions and the surface anomalies underlying the upper pole-yoke deposition.

It is an object of this invention to create a planarized upper pole-tip fabrication procedure to eliminate critical alignment requirements from subsequent deposition procedures.

It is another object of this invention to provide a planarized stitching pedestal for registration of the upper pole-yoke deposition procedure and formation of the pole stitching junction.

It is yet another object of the method of this invention to eliminate yield uncertainty associated with variations in upper pole-yoke masking.

It is yet another object of the method of this invention to reduce fabrication complexity and improve yield through elimination of close masking tolerances and multiple masking steps.

It is an advantage of the method of this invention that a portion of the same photoresist mask layer used to deposit the upper pole-tip is retained in the stitching junction region for later pole-yoke stitching, thereby eliminating any subsequent mask registration steps. It is another advantage of the method of this invention that the hardened photoresist stitching pedestal acts to planarize the surface formed by subsequent insulating layers at the stitching junction.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIGS. 2A–2B, shows the lower pole $P_1$ deposition step of the method of this invention;

FIG. 3, comprising FIGS. 3A–3B, shows the upper pole-tip $P_{2t}$ deposition step of the method of this invention;

FIG. 4, comprising

FIG. 5, comprising

FIG. 6, comprising

FIG. 7, comprising

FIG. 8, comprising

DETAILED DESCRIPTION OF THE PREFERRED EMBODIMENTS

Figure 1:
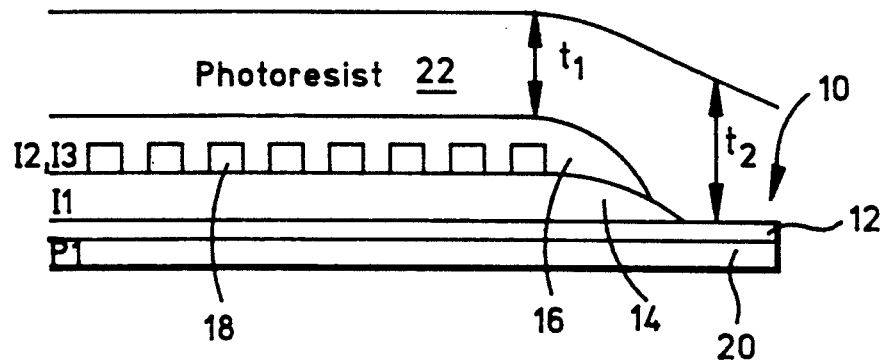
FIG. 1 illustrates the typical pole-tip gap wedge topography encountered with the fabrication methods of the prior art, FIG. 2, comprising

FIG. 1 provides the side view of a typical thin film inductive head fabricated according to a method known in the art. The initial deposition of the lower pole $P_1$ layer 20 is followed by deposition of gap-forming layer 12 and insulation $I_1$ layer 14 to create gap wedge region 10 as shown. With each subsequent deposition procedure, the topography of gap wedge region 10 builds up. Preparatory to deposition of the upper pole $P_2$ layer (not shown), a photoresist layer 22 is deposited over the entire underlying structure. The topography of gap wedge region 10 causes a variation in thickness in photoresist layer 22 as shown. Thickness $t_1$ may be only a few microns where thickness $t_2$ often exceeds 15 microns. Disadvantageously, the narrowest portions of the upper pole P 2 layer must be deposited at the thickest portion of photoresist layer 22.

Figure 9A:
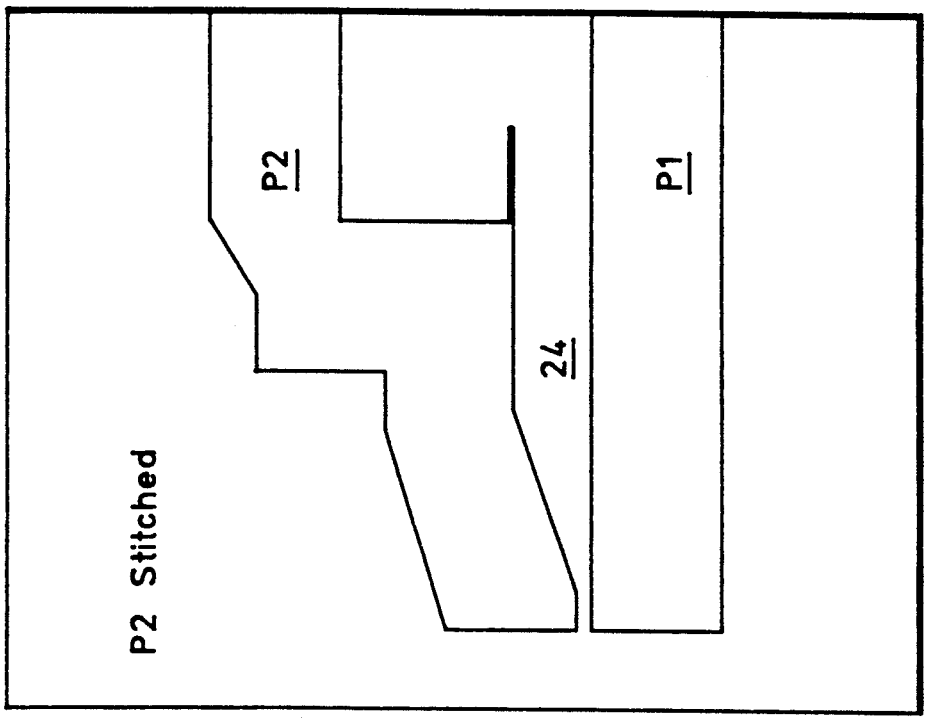
FIGS. 9A–9B, shows the deep gap field modeling results for the stitched upper pole head fabricated in accordance with the method of this invention.
Figure 8A:
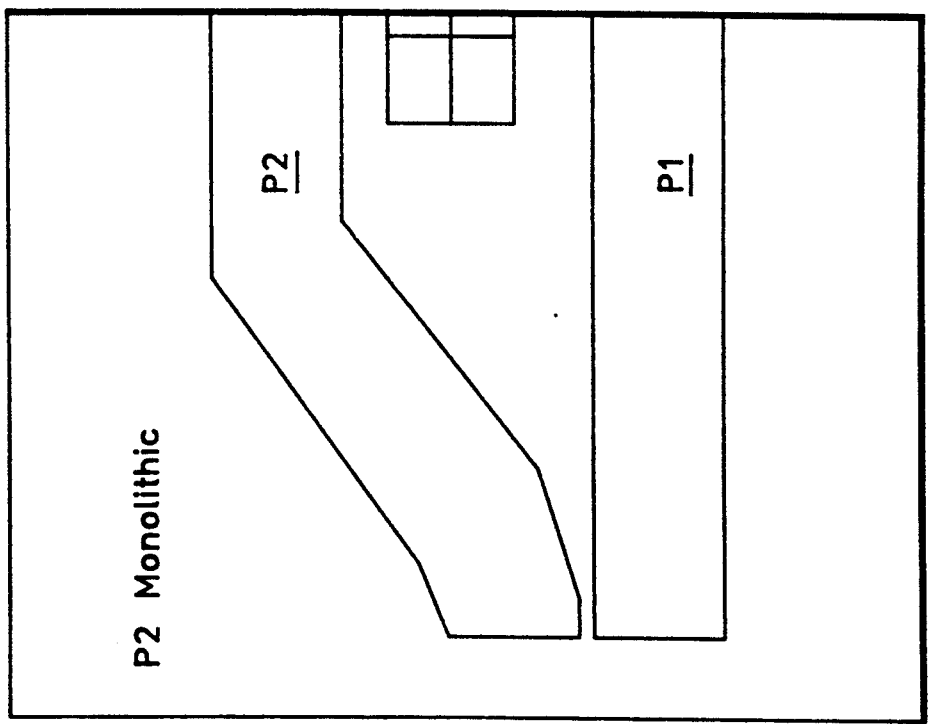
FIGS. 8A–8B, shows the deep gap field modeling results for the upper pole structure from the prior and FIG. 9, comprising
Figure 8B:
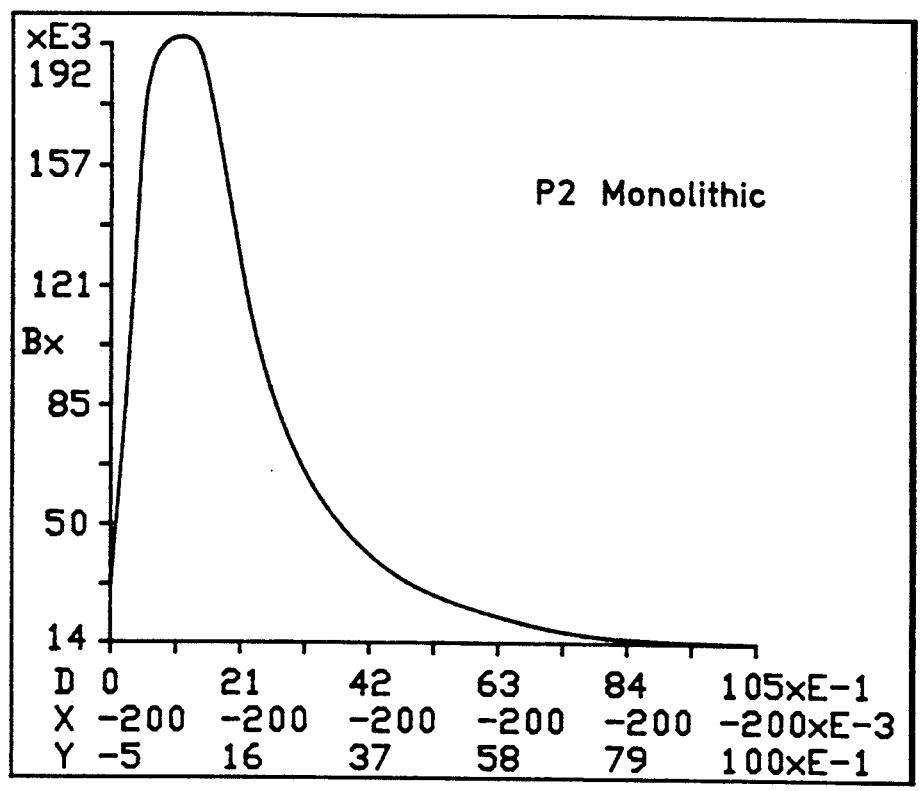
Figure 9B:
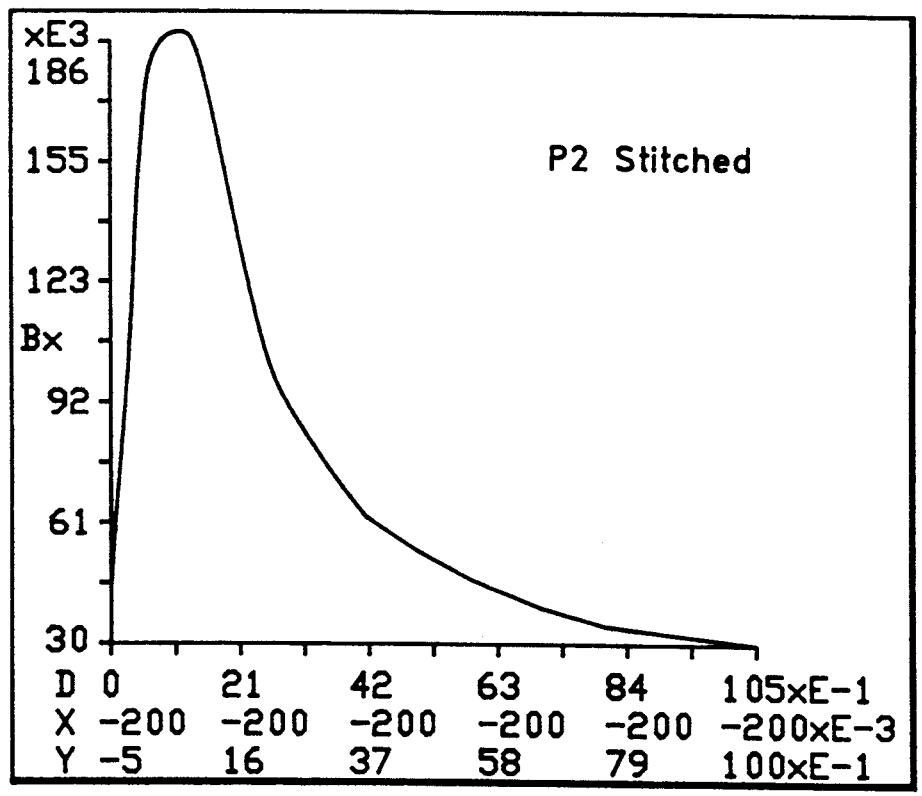

The method of this invention employs a "stitched" upper pole $P_2$ to avoid the problems discussed above in connection with FIG. 1. This approach permits fabrication of inductive heads having track widths of less than 1.5 microns by eliminating the thick photoresist constraint on the upper pole-tip width. This upper pole stitching method requires no unusual fabrication steps and can be implemented with existing fabrication tools. The inventors examined mathematical models to evaluate the potential degradation in the write field arising from the increased overlap area between the upper pole-tip and the lower pole (region 24 in FIG. 9A). FIGS. 8 and 9 compare the theoretical deep gap field for the upper pole of the prior art (FIG. 8) with the two-element stitched upper pole (FIG. 9). The results demonstrate that there is a minor reduction in deep gap field of less than 5% resulting from the stitching of two pole elements to form upper pole $P_2$. FIGS. 8A and 9A show the cross-sectional structures used in the modeling and FIGS. 8B and 9B show the head fields computed for the two structures. Such a minor loss in write field can be avoided in part by increasing the first insulation $I_1$ layer thickness and/or limiting the size of the upper pole-tip to reduce the pole overlap area 24 (FIG. 9A).

FIG. 2 illustrates the lower pole $P_1$, layer deposition procedure of the method of this invention. FIG. 2A shows the top view of the lower pole $P_1$, layer 26 deposited on a substrate 28 using any useful method known in the art such as conventional frame plating. FIG. 2B shows the sectional view through the middle of FIG. 2A. After deposition of layer 26, a gap-forming layer 30 is deposited over at least layer 26. The first insulation $I_1$ layer 32 is then deposited over the back pole-yoke region 29 of layer 30 as shown. The front pole-tip region 31 of layer 30, including gap wedge region 10, is left exposed. Gap-forming layer 30 is preferably alumina. Insulation $I_1$ layer 32 is also alumina or silica. Following formation of layer 32, a photoresist layer 34 is deposited and hard baked.

The next procedure of the method of this invention is to coat photoresist layer 34 with a mask defining the upper pole-tip $P_{2t}$ layer 36 for window-frame plating. The topology difference between upper pole-tip 36 and insulation $I_1$ layer 32 is not yet more than perhaps 3 microns. Moreover, because the upper pole-yoke region 29 will not be plated in this procedure, the photoresist thickness in the front pole-tip region 31 can be adjusted to perhaps five microns for a target upper pole-tip thickness of four microns. This reduces the aspect ratio substantially from the conventional method that defines the upper pole-tip and yoke after the third insulation hardbake procedure. Upper pole-tip $P_{2t}$ layer 36 is frame-plated through the masked photoresist layer 34, which is not shown in FIG. 3B. Photoresist layer 34 is removed in part of the region through which the FIG. 3B section is taken to permit upper pole-tip 36 deposition.

Figures 4A, 4B:
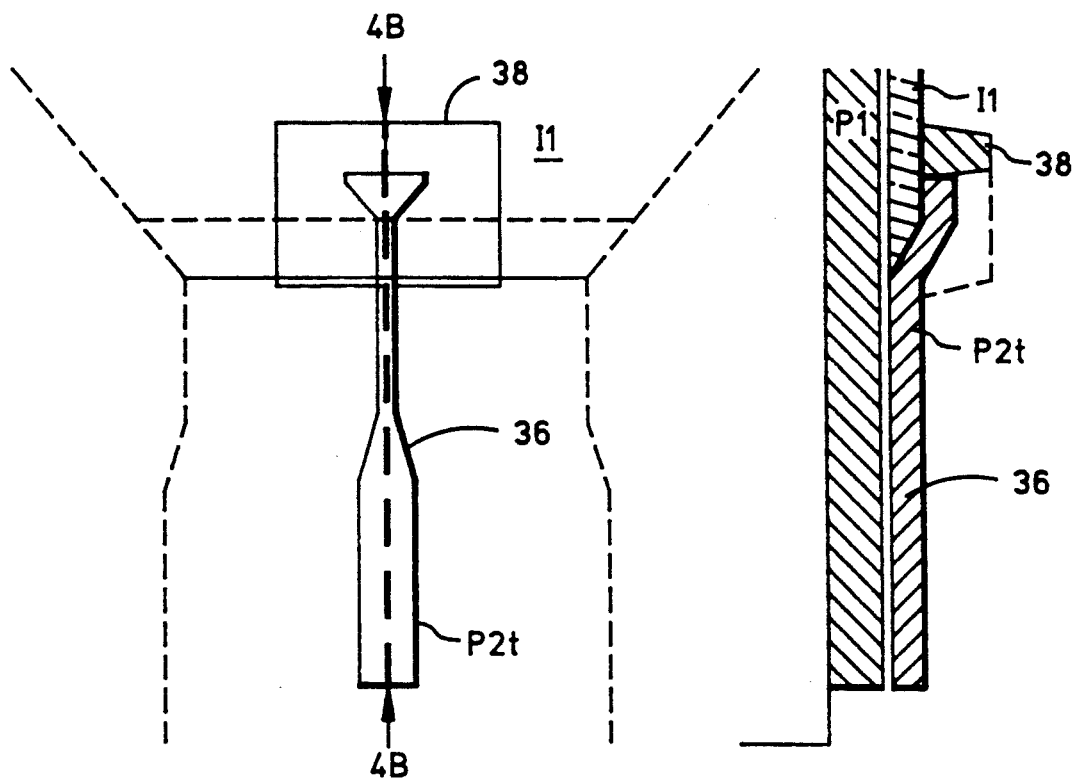
FIGS. 4A–4B, shows the planarizing hard-baked photoresist step of the method of this invention.

The method of this invention next exposes the photoresist frame 34 with a mask for planarization before removing the excess photoresist material from layer 34. The planarization mask (not shown) leaves the planarized upper pole stitching pedestal 38 seen in FIG. 4A. Pedestal 38 is prealigned with upper pole-tip 36 and is elevated above insulating $I_1$ layer 32 to force the alignments of subsequent insulating layers with respect to upper pole-tip 36. The photoresist material remaining in pedestal 38 is then hard-baked to make it permanent. Pedestal 38 is shown partially dotted in FIG. 4B to reflect the absence of hard baked photoresist material over pole-tip 36 along the section line.

Figures 5A, 5B:
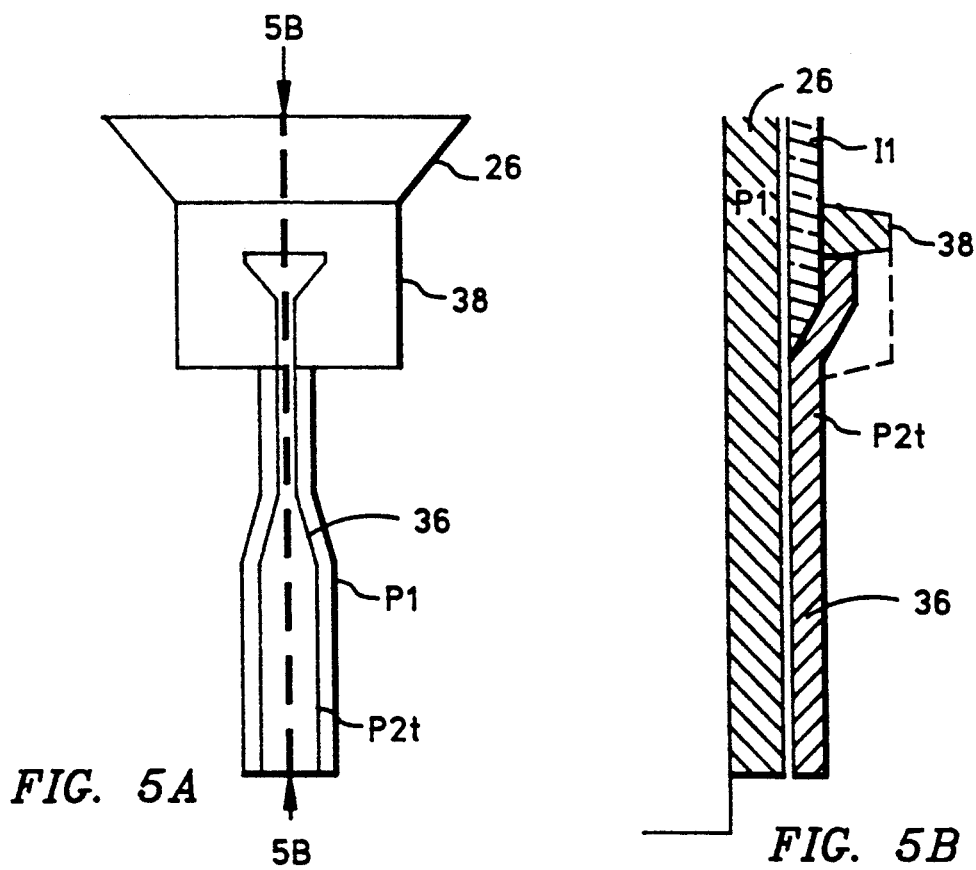
FIGS. 5A–5B, shows the stitching junction pedestal formation step of the method of this invention.

FIG. 5 illustrates the results following the usual procedures for adding a photoresist mask for the chemical etching of the upper pole-tip 36 and for chemically etching layer 36 and for sputter-etching the seed layer (not shown). Also, if magnetoresistive (MR) elements are to be incorporated, the necessary processes (not shown) to accommodate this are completed at this stage. FIG. 5 shows the relationship between lower pole $P_1$ layer 26, upper pole-tip $P_{2t}$ layer 36 and upper pole stitching pedestal 38.

Figure 6A:
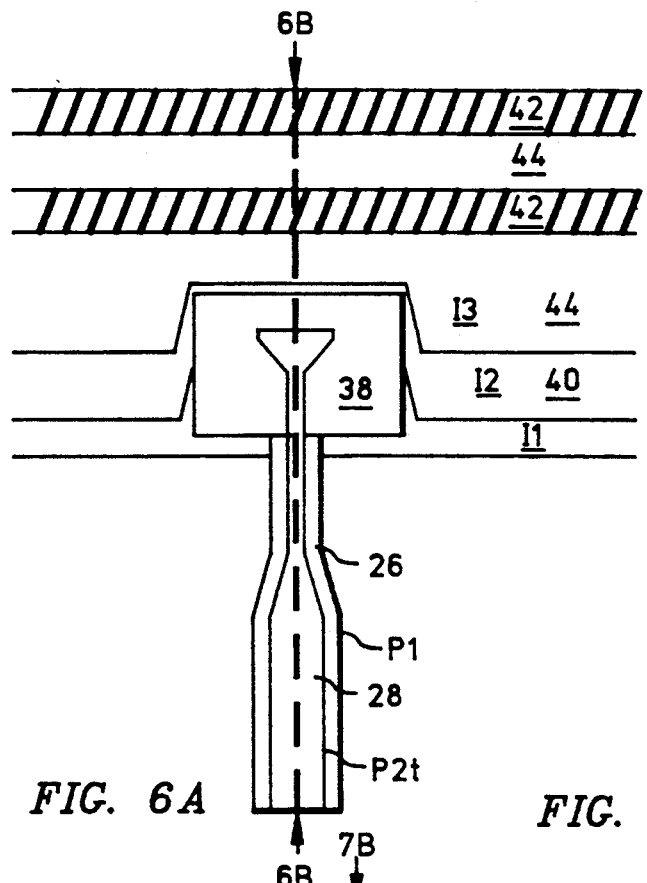
FIGS. 6A–6B shows the coil and subsequent insulating layer deposition steps of the method of this invention.
Figure 6B:
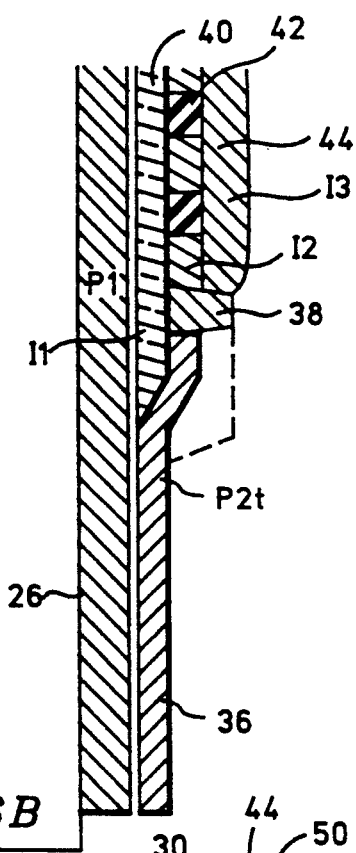

FIG. 6 shows the results of subsequent coil and insulating layer depositions. An insulating $I_2$ layer 40 and a conductive coil material layer 42 are created as shown. An insulating $I_3$ layer 44 is then deposited over the coil assembly as shown in FIGS. 6A and 6B. Note that the edges of layers 40 and 44 are automatically aligned by pedestal 38 in the upper pole stitching region, thereby planarizing the stitching region.

Figure 7A:
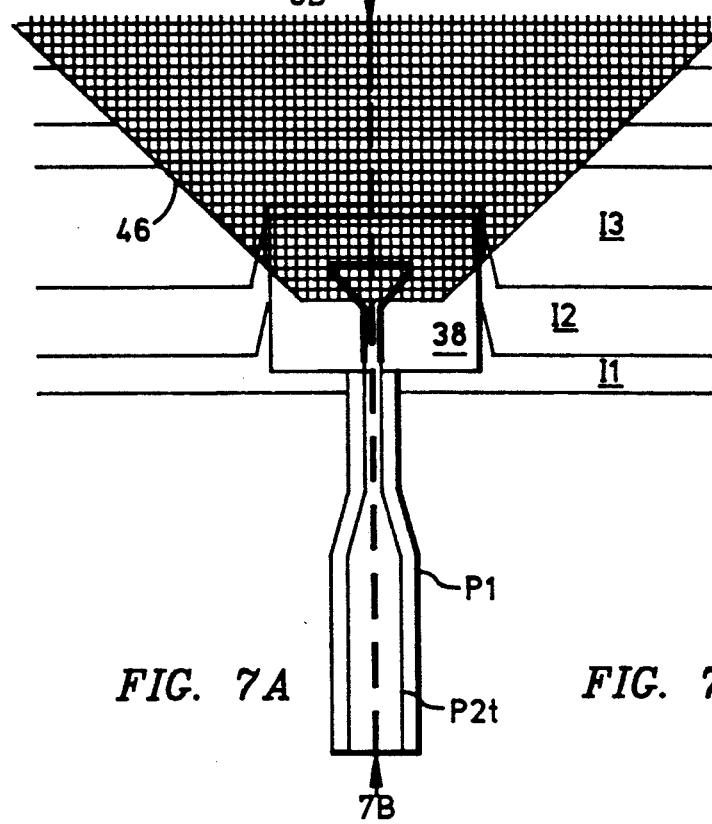
FIGS. 7A–7B, shows the upper pole-yoke $P_{2y}$ deposition step of the method of this invention.
Figure 7B:
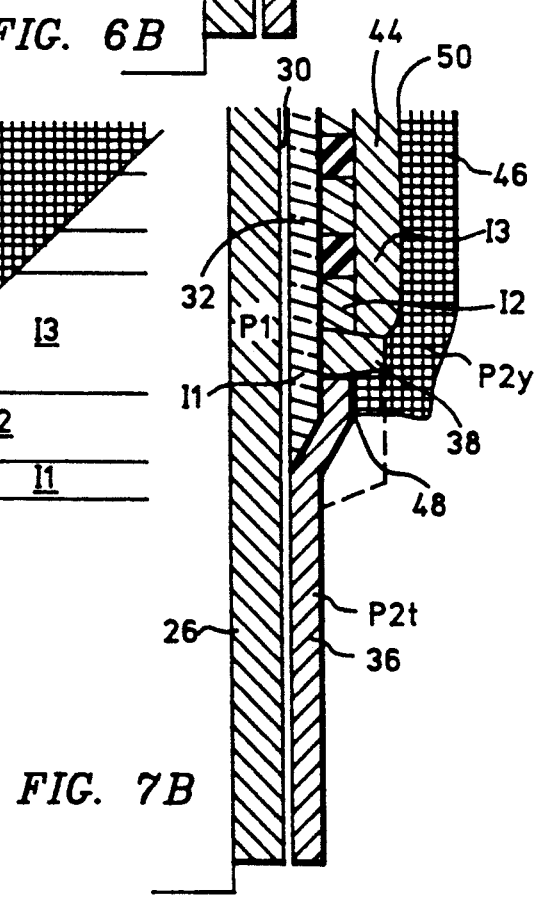

Finally, in FIG. 7, the upper pole-yoke $P_{2y}$ layer 46 is created. After depositing a photoresist mask (not shown) for the upper pole-yoke, layer 46 is frame plated with the excess material etched away in the usual manner. Note that the two upper-pole elements 36 and 46 are joined at stitching junction 48, which is pre-masked by pedestal 38. The stitching process is enormously simplified and the upper pole-yoke mask is a simple trapezoid without refined elements or critical alignments. Also, the topography of the surface 50 under upper pole-yoke $P_{2y}$ layer 46 is essentially planarized as a result of the planarizing effect of pedestal 38. Without this planarizing effect, upper pole-yoke layer 46 would be forced to fill in any gaps left open between insulating layers 40 and 44 and lower pole-tip layer 36. Such gaps are well-known sources of yield problems in the art. An opening (not shown) may be etched in the back of insulating layers 30, 32, 40 and 44 before deposition of upper pole-yoke 46 to permit the usual rear connection to lower pole layer 26.

The creation of planarized hard-baked photoresist pedestal 38 around stitching junction 48 eliminates all critical alignment requirements for subsequent insulating layers 40 and 44 and upper pole-yoke layer 46. Also, the stitching region 48 between upper pole-tip 36 and upper pole-yoke 46 is defined by the original mask for pole-tip 36, which eliminates all misregistration normally arising from built-up masking tolerances. Thus, pedestal 38 not only reduces process complexity but also improves the device yield and the reproduceability of device specifications.

The method of this invention uses simple processing techniques available in the art and no new materials or fabrication tools are required. The method of this invention may also be used to fabricate inductive heads having wider track-widths with similar advantage.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for fabricating a thin film magnetic head, said method comprising the steps of:
  (a) depositing a first layer of ferromagnetic pole material on a substrate to form a lower pole having a front pole-tip region and a back pole-yoke region, said front and back regions overlapping in a yoke-tip junction area;
  (b) depositing a second layer of nonmagnetic insulating material over said first layer;
  (c) depositing a third layer of photoresist material over said second layer;
  (d) defining an upper pole-tip area by selectively removing portions of said third layer from said front pole-tip region;

(e) depositing a fourth layer of ferromagnetic pole material on said second layer in said upper pole-tip area to form an upper pole-tip;

(f) hardening said photoresist material in said yoke-tip junction area of said third layer to form an upper pole stitching pedestal;

(g) depositing at least one fifth layer of conductive coil material to form one or more coils over said back pole-yoke region of said second layer;

(h) depositing at least one sixth layer of nonmagnetic insulating material over said fifth layer; and (i) depositing a seventh layer of ferromagnetic pole material over said back pole-yoke region of said sixth layer to form an upper pole-yoke such that said upper pole-yoke joins with said upper pole-tip at said upper pole stitching pedestal.

2. The method of claim 1 wherein said second depositing step (b) comprises the steps of:

(b.1) depositing a gap-forming layer of nonmagnetic insulating material over said first layer; and (b.2) depositing an insulating layer of nonmagnetic insulating material over said back pole-yoke region of said gap-forming layer.

3. The method of claim 2 wherein said seventh depositing step (i) comprises the steps of:

(i.1) forming an opening in said back pole-yoke region to expose a portion of said lower pole; and (i.2) depositing a seventh layer of ferromagnetic pole material over said back pole-yoke region of said sixth layer to form an upper pole-yoke such that said upper pole-yoke joins with said upper pole-tip at said upper pole stitching pedestal and such that said upper pole-yoke joins with said lower pole at said opening.

4. The method of claim 3 wherein said first, fourth and seventh layers include permalloy.

5. The method of claim 4 wherein said second and sixth layers include at least one material selected from a group consisting of silica and alumina.

6. The method of claim 1 wherein said seventh depositing step (i) comprises the steps of:

(i.1) forming an opening in said back pole-yoke region to expose a portion of said lower pole; and (i.2) depositing a seventh layer of ferromagnetic pole material over said back pole-yoke region of said sixth layer to form an upper pole-yoke such that said upper pole-yoke joins with said upper pole-tip at said upper pole stitching pedestal and such that said upper pole-yoke joins with said lower pole at said opening.

7. The method of claim 1 wherein said first, fourth and seventh layers include permalloy.

8. The method of claim 1 wherein said second and sixth layers include at least one material selected from a group consisting of silica and alumina.

* * * * *